United States Patent [19]

Clear

[11] 4,451,389
[45] May 29, 1984

[54] AQUEOUS GELS

[75] Inventor: Elmer E. Clear, Bartlesville, Okla.

[73] Assignee: Phillips Petroleum Company, Bartlesville, Okla.

[21] Appl. No.: 343,641

[22] Filed: Jan. 28, 1982

Related U.S. Application Data

[62] Division of Ser. No. 152,227, May 22, 1980, Pat. No. 4,321,968.

[51] Int. Cl.$^3$ .................... E21B 43/22; E21B 43/26; C09K 7/02
[52] U.S. Cl. .................... 252/315.3; 166/275; 252/8.5 A; 252/8.5 C; 252/8.55 R; 252/8.55 D
[58] Field of Search ............ 166/275, 300, 293, 302, 166/308; 252/8.5 A, 8.5 C, 8.55 R, 8.55 D, 315.3

[56] References Cited

U.S. PATENT DOCUMENTS

| | | | |
|---|---|---|---|
| 2,618,595 | 11/1952 | Gloor | 252/8.5 |
| 3,378,070 | 4/1968 | Wessler et al. | |
| 3,417,820 | 12/1968 | Epler et al. | |
| 3,611,733 | 10/1971 | Eilers et al. | |
| 3,727,687 | 4/1973 | Clampitt et al. | 166/274 |
| 3,848,673 | 11/1974 | Clampitt et al. | |
| 3,922,173 | 11/1975 | Misak | 252/8.55 |
| 3,962,099 | 6/1976 | Whitfill | |
| 3,996,351 | 12/1976 | Bauer et al. | |
| 4,025,443 | 5/1977 | Jackson | |
| 4,110,231 | 8/1978 | Swanson | |
| 4,151,096 | 4/1979 | Jackson | |

FOREIGN PATENT DOCUMENTS

| | | | |
|---|---|---|---|
| 7507124 | 2/1976 | Netherlands | 252/8.5 |
| 1528258 | 10/1978 | United Kingdom | |

*Primary Examiner*—Herbert B. Guynn

[57] ABSTRACT

Carboxymethylhydroxyethyl cellulose in aqueous brine solutions is gelled by the addition of an alkaline earth metal hydroxide such as calcium hydroxide. The gelled compositions have utility as water diversion agents, pusher fluids, fracturing fluids, drilling muds, workover fluids, and completion fluids.

12 Claims, No Drawings

AQUEOUS GELS

This application is a division of my copending application having Ser. No. 152,227, filed May 22, 1980 now U.S. Pat. No. 4,321,968.

This invention relates to new aqueous gels and uses thereof. In accordance with another aspect, this invention relates to gelled aqueous brines containing carboxymethylhydroxyethyl cellulose (CMHEC) and a gelling agent. In a further aspect, this invention relates to a method of gelling brines comprising the addition of carboxymethylhydroxyethyl cellulose (CMHEC) and a gelling agent. In accordance with a further aspect, this invention relates to the use of the instant compositions as water diversion agents, pusher fluids, fracturing fluids, drilling muds, and work-over or completion fluids.

Accordingly, an object of this invention is to provide novel thickened and gelled fluids.

A further object of this invention is to provide thickened and gelled fluids useful in the treatment of wells.

Other aspects, objects, and the several advantages of this invention will become apparent to those skilled in the art upon reading this disclosure and the appended claims.

In accordance with the invention, a gelled aqueous composition is provided which comprises an aqueous brine solution containing carboxymethylhydroxyethyl cellulose (CMHEC) and a sufficient amount of alkaline earth metal hydroxide to cause gelation and form a gelled composition.

In accordance with one embodiment of the invention, brine solutions are gelled with carboxymethylhydroxyethyl cellulose (CMHEC) and an alkaline earth metal hydroxide, such as calcium hydroxide.

The aqueous gels of the invention are particularly useful in operations wherein a fluid medium is introduced into a bore hole in the earth as in secondary recovery operations, well treating operations, well completion operations, etc.

Carboxymethylhydroxyethyl cellulose (CMHEC) polymers suitable for use in the instant process are characterized by a degree of substitution (D.S.) in the broad range of about 0.1 to about 1, preferably about 0.2 to about 0.5 and a molar substitution (M.S.) in the broad range of about 1 to about 4, preferably about 2 to about 3. The "degree of substitution" designates the average number of hydroxyl groups per cellulosic anhydroglucose unit which are substituted with carboxymethyl groups. The "molar substitution" designates the average number of moles of hydroxyethyl groups present per cellulosic anhydroglucose unit. A commercially available polymer suitable for use in the invention is CMHEC of 0.4 carboxymethyl D.S. and 2.0 hydroxyethyl M.S.

The amount of cellulose ether (CMHEC) used in the practice of the invention can vary widely depending upon the viscosity grade and purity of the ether, and properties desired in the aqueous gels of the invention. In general, the amount of cellulose ether (CMHEC) used will be a water thickening amount, i.e., at least an amount which will significantly thicken the water to which it is added. Generally speaking, amounts in the range of about 0.5 to about 4 lbs/barrel, preferably from about 2 to 3 lbs/barrel of solution will be used. However, amounts outside these ranges can be used.

The term "increased viscosity" or the term "thickened" as used herein in the descriptions with respect to the aqueous solutions, is intended to mean any increase in the viscosity of a solution of the polymer even up to the point where it is no longer flowable. Thus, solutions can be prepared covering a wide range of viscosities depending on the application intended.

As used herein, the term "brine" is intended to include any aqueous solution of mineral salts having greater than 1,000 ppm solids content, such as are frequently present in oil fields. Oil field brines commonly contain varying amounts of sodium chloride, calcium chloride, or mangnesium salts. Also, flooding solutions are frequently modified by the addition of potassium chloride to stabilize the subsurface clay. Accordingly, potassium chloride is also frequently encountered. In practical applications, such as the post-primary petroleum recovery operations, the naturally occurring brine which is encountered will be predominantly sodium chloride or potassium chloride but a great number of other salts are almost always present.

The aqueous medium in the present invention is preferably a hard brine comprising on the order of 1,000 to 16,000 ppm divalent cations such as preferably $Ca++$ with a total dissolved solids (TDS) level in the range of 100,000 to 300,000 ppm. It is contemplated that the inventive compositions would be most applicable in areas characterized by the availability of highly saline field waters.

The gelling agents, according to the invention, are the alkaline earth metal (Group IIA) hydroxides, preferably calcium hydroxide. The amount of gelling agent used in the practice of the invention will be a small but finite amount which is effective or sufficient to cause gelation when the alkaline earth metal hydroxide is mixed with the remaining ingredients of the aqueous composition. In general, the amount of gelling agent added will range from about 0.25 to about 4 lbs/barrel, preferably about 0.5 to about 3 lbs/barrel of solution.

Various methods can be used for preparing the aqueous gels of the invention. The alkaline earth metal hydroxide can be first added to a solution of CMHEC in the brine. Generally speaking, where convenient, the preferred method is to first disperse the CMHEC in the brine and then add the alkaline earth metal hydroxide to gel the solution.

As water diversion agents and pusher fluids, respectively, the inventive compositions can be injected at injection wells to correct the permeability profile of a formation or for mobility control in a post-primary oil recovery operation. The inventive compositions can function as permeability correction agents by temporarily decreasing water permeability in "thief zones" (high permeability areas) and thus direct the subsequently injected drive fluids to the less permeable, relatively oil-rich zones. The effectiveness of such agents is reflected by the magnitude of the increase observed in the oil-to-water ratio at surrounding production wells. The instant compositions can function as pusher fluids (mobility buffers), e.g., in surfactant flooding by injecting the compositions as viscous slugs to push the previously injected surfactant slug and recovered oil to a producing well. The viscosity of the pusher fluid relative to that of the surfactant slug, in such that little or no fingering of the slug into the surfactant slug takes place.

As hydraulic fracturing fluids, the inventive compositions can be employed to increase the production of oil from subterranean formations. Hydraulic fracturing comprises the injection of a suitable fracturing fluid down a well penetrating a formation and into said formation under sufficient pressure to fracture the formation. The resulting crack or fracture in the formation provides a passageway which facilitates flow of fluids through the formation and into the well. Propping agents can be included in the inventive compositions if desired. Propping agents which can be used include any of those known in the art, e.g., sand grains, walnut shell fragments, tempered glass beads, aluminum pellets, and similar materials, so long as they meet the appropriate compatibility requirements. Generally speaking, it is desirable to use propping agents having particle sizes in the range of 8 to 40 mesh (U.S. Sieve Series). However, particle sizes outside this range can be employed. The observed gel strengths of the novel composition (see Table I) indicate its superior proppant-carrying ability.

It is contemplated that various known agents can be added to the inventive compositions to minimize fluid loss to the formation during fracturing operations. Apparently, these fluid loss additives decrease the transfer of water into the formation by temporarily plugging the exposed faces of the more accessible channels and passages in the formation. One of the ways this is done is by increasing the viscosity of the fracturing fluid. The viscosity of the inventive fluid aids in minimizing this fluid loss.

It is contemplated that the instant compositions have application in the area of drilling muds, work-over fluids and completion fluids. The suspending capacity of the fluids can be enhanced by the presence of calcium ions under alkaline conditions which may be effected by the addition of lime to the fluids containing CMHEC. A mud with good suspending capacity can convey the large cuttings to the surface where most of the cuttings can be removed. The mud containing the cuttings must stand in a settling pit to allow the cuttings sufficient time to settle out, or the cuttings can be separated by cyclones or centrifuging.

The thickened compositions of the invention intended for use as fracturing, water diversion or mobility buffer fluids can be prepared on the surface in a suitable tank equipped with suitable mixing means, and then pumped down the well and into the formation employing conventional equipment for such compositions. However, it is within the scope of the invention to prepare the compositions while they are being pumped down the well. This technique is sometimes referred to as "on the fly." For example, an aqueous saline solution of the polymer can be prepared in a tank adjacent the well head. Pumping of this solution through a conduit to the well head can then be started. Then, a few feet downstream from the tank, a suitable connection can be provided for introducing an aqueous solution of an alkaline earth metal hydroxide such as calcium hydroxide. As will be understood by those skilled in the art, the rate of introduction of the components into the conduit will depend upon the pumping rate of the inventive composition through the conduit. Mixing orifices can be provided in the conduit, if desired.

When prepared for use in drilling, completion and work over fluids, the materials of this invention, can be prepared using conventional mud mixing equipment. Polymer is generally added to the drilling mud through jet hoppers discharging into the suction pit. Lime can also be mixed through this jet hopper. The materials are in turn mixed with the drilling mud by either jet or paddle mixers. Hydration occurs as the mud is being mixed and pumped through the bit nozzles.

It is within the scope of the invention to precede the injection of the thickened composition as a fracturing fluid into the well and out into the formation with a preflush of a suitable cooling fluid, e.g., water. Such fluids serve to cool the well tubing and formation and extend the useful operating temperature range of the compositions. The volume of the cooling fluid so injected can be any suitable volume sufficient to significantly decrease the temperature of the formation being treated, and can vary depending upon the characteristics of the formation. For example, amounts up to 20,000 gallons, or more, can be used to obtain a temperature decrease on the order of 100° to 250° F.

The following example further illustrates but should not be considered as unduly limiting on the invention.

EXAMPLE I

A hard brine solution was prepared by mixing 3150 mL of saturated sodium chloride solution (26 weight percent NaCl), 350 mL deionized water and 150 g calcium chloride. Various amounts of carboxymethylhydroxyethyl cellulose (CMHEC) were added to samples of the hard brine and these mixtures were gelled by the addition of hydrated lime. Apparent viscosities and gel strengths of the thickened fluids were determined and the results are tabulated in Table I.

TABLE I

Apparent Viscosities and Gel Strengths of CMHEC/Hard Brine Mixtures Gelled With Lime

| Run No. | Run Type | Concentration (lb/bbl)[a] CMHEC[b] | Lime | Apparent Viscosities (cp) 51 Sec$^{-1}$ | 102 Sec$^{-1}$ | 170 Sec$^{-1}$ | 340 Sec$^{-1}$ | 511 Sec$^{-1}$ | 1022 Sec$^{-1}$ | Gel Strengths, lbs/100 ft.$^2$ (10 sec/10 min.) |
|---|---|---|---|---|---|---|---|---|---|---|
| 1 | Control | 3 | 0 | 540 | 350 | 252 | 160.5 | 123 | 80.5 | 19/17 |
| 2 | Invention | 3 | 2 | 1550 | 1050 | 726 | 513 | 352 | 181.5 | 45/92 |
| 3 | Control | 4 | 0 | 1050 | 640 | 444 | 273 | 208 | 126.5 | 45/45 |
| 4 | Invention | 4 | 0.5 | 1660 | 1100 | 750 | 465 | 332 | 180 | 65/82 |

[a]1 g reagent per 350 ml solution is equivalent to 1 lb. reagent per barrel of solution, e.g., 150 g CaCl$_2$ in 3150 ml saturated NaCl solution + 350 ml deionized water is equivalent to 15 lbs. CaCl$_2$ per barrel of solution.
[b]CMHEC-420 was used in these runs. CMHEC-420 is carboxymethylhydroxyethyl cellulose with a 0.4 degree of substitution and a 2 value for molar substitution.

Referring to Table I, the greater gel strengths of the inventive runs (No. 2 and No. 4) compared, respectively, to the control runs (No. 1 and No. 3) indicate that the inventive thickened fluids could advantageously be used to suspend cuttings in drilling muds and proppants in fracturing fluids. The apparent viscosities show that all the inventive and control fluids are thixotropic (shear-thinning). A comparison of the apparent viscosities exhibited by the inventive runs (No. 2 and No. 4) respectively, with the control runs (No. 1 and No. 3) indicate that the lime treatment greatly enhanced the apparent viscosity of the invention runs. This suggests in particular that the inventive compositions would be suitable for use as mobility buffers in carbonate reservoirs.

I claim:

1. A gelled aqueous brine composition which comprises
   (a) an aqueous brine solution having at least 1,000 ppm divalent cations,
   (b) a water thickening amount of carboxymethylhydroxyethyl cellulose (CHMEC) characterized by a degree of substitution (DS) ranging from about 0.1 to about 1 and a molar substitution (MS) ranging from about 1 to about 4, and
   (c) an amount of an alkaline earth metal hydroxide sufficient to cause gelation and form said gelled composition.

2. A composition according to claim 1 wherein (b) is characterized by a degree of substitution ranging from about 0.2 to about 0.5 and a molar substitution ranging from about 2 to about 3.

3. A composition according to claim 1 wherein the amount of (b) present ranges from about 0.5 to about 4 lbs/barrel and the amount of (c) present ranges from about 0.25 to about 4 lbs/barrel of solution.

4. A composition according to claim 1 wherein (c) is calcium hydroxide.

5. A composition according to claim 4 wherein the amounts of (b) present range from about 2 to about 3 lbs/barrel of solution and the amount of (c) present ranges from about 0.5 to about 3 lbs/barrel of solution.

6. A method of preparing a thickened and gelled aqueous brine solution which comprises mixing an aqueous brine having at least 1,000 ppm divalent cations with a water thickening amount of carboxymethylhydroxyethyl cellulose characterized by a degree of substitution (DS) ranging from about 0.1 to about 1 and a molar substitution (MS) ranging from about 1 to about 4 and a gelling amount of an alkaline earth metal hydroxide.

7. A method according to claim 6 wherein the amount of carboxymethylhydroxyethyl cellulose ranges from about 0.5 to about 4 lbs/barrel of solution and the amount of alkaline earth metal ranges from about 0.25 to about 4 lbs/barrel of solution.

8. A method according to claim 6 wherein the alkaline earth metal hydroxide is calcium hydroxide.

9. A method according to claim 8 wherein the amount of carboxymethylhydroxyethyl cellulose ranges from about 2 to about 3 lbs/barrel and the amount of calcium hydroxide ranges from about 0.5 to about 3 lbs/barrel.

10. A method according to claim 6 wherein (b) is characterized by a degree of substitution ranging from about 0.2 to about 0.5 and a molar substitution ranging from about 2 to about 3.

11. A gelled aqueous brine composition which comprises
    (a) an aqueous hard brine comprising on the order of 1,000 to 16,000 ppm divalent cations and a total dissolved solids (TDS) level in the range of 100,000 to 300,000 ppm,
    (b) about 0.5 to about 4 lbs./barrel brine of carboxymethylhydroxyethylcellulose (CMHEC) characterized by a degree of substitution (DS) ranging from about 0.1 to about 1 and a molar substitution (MS) ranging from about 1 to about 4, and
    (c) about 0.25 to about 4 lbs./barrel brine of an alkaline earth metal hydroxide.

12. A composition according to claim 11 wherein (c) is calcium hydroxide.

* * * * *